3,535,360
α-HALOGENO ISOCYANATES AND
PREPARATION THEREOF
Hans Holtschmidt, Cologne-Stammheim, and Eberhart Degener, Leverkusen, Germany, assignors to Farbenfabriken Bayer Aktiengesellschaft, Leverkusen, Germany, a corporation of Germany
No Drawing. Continuation-in-part of application Ser. No. 131,504, Aug. 15, 1961. This application June 7, 1965, Ser. No. 462,137
Int. Cl. B01j 1/10; C07c.119/04
U.S. Cl. 260—453      5 Claims

ABSTRACT OF THE DISCLOSURE

α-halogeno isocyanates such as 1,1,2,2-tetrachloroethyl isocyanate, trichloromethyl isocyanate and pentachloroethyl isocyanate prepared by halogenating the corresponding isocyanate in the presence of ultraviolet light. These halogeno isocyanates are suitable for use as intermediates for the product of plant protecting agents and pharmaceuticals.

---

This invention relates generally to isocyanates and more particularly to a method of producing aliphatic isocyanates having halogen atoms in the α-position, and is a continuation-in-part of application Ser. No. 131,504, now abandoned.

It has been the practice heretofore to prepare alkyl isocyanates having halogen atoms in the α-position by the thermal decomposition of an α-halogenoalkyl carboxylic acid azide. Such a method is not suitable for commercial production particularly when it is desired to make an alkyl isocyanate having more than one halogen atom in the α-position.

An acylated alkyl amine having halogen atoms in the α-position can be prepared by reacting the corresponding acylated α-hydroxy alkyl amine with a hydrohalic acid or with a phosphorus halide. Because of the reactivity of —NCO groups, such a method is not suitable for preparing an α-halogenoalkyl isocyanate.

No attempt has been made to produce acylatel α-halogenoalkyl amines by the direct chlorination of acylated alkylamines since it was expected that a halogenation would result in an assault on the acyl group and also splitting of the N—C-bonds and would not result in a smooth conversion to the acylated α-halogenoalkyl amine.

It is an object of this invention to provide an improved method for preparing alkyl isocyanates containing halogen atoms in the α-position. Another object of the invention is to provide a method for making α-halogenoalkylisocyanates devoid of the foregoing disadvantages. A more specific object of the invention is to provide a method for preparing alkyl isocyanates having more than one halogen atom in the α-position.

The foregoing objects and others are accomplished in accordance with this invention, generally speaking, by providing a method wherein an alkyl isocyanate containing at least one hydrogen atom in the α-position is halogenated by treating it with a halogenating agent. It was surprising to discover that halogen atoms could be substituted in the α-position to the isocyanate group simply by treating the isocyanate with a halogenating agent, since in most attempts to halogenate an aliphatic compound in α-position to a functional substituent which contains a trivalent basic nitrogen atom, especially an amine derivative, this substituent is attacked or destroyed. Alkyl amines and acylated alkyl amines cannot be chlorinated, and if an aliphatic isothiocyanate is treated with halogen it reacts to form isocyanide dihalides through reaction of the isothiocyanate group with the halogen.

The process provided by this invention is adaptable to the preparation of all α-halogen-substituted aliphatic and araliphatic isocyanates from an aliphatic and araliphatic isocyanate containing at least one hydrogen atom in the α-position. Hydrogenhalide adducts of isocyanates or in other words carbamic acid halides can be used in accordance with this invention instead of aliphatic and araliphatic isocyanates. The invention is applicable to both mono-isocyanates and polyisocyanates. Suitable isocyanates are e.g. mono- and polyalkyl isocyanates and mono- and polyalkylene isocyanates, the alkyl and alkylene groups containing preferably 1 to 18 carbon atoms. If an organic polyisocyanate is halogenated the halogenation takes place at all activated α-positions in the molecule. The following are typical examples of suitable alkyl isocyanates, alkylene polyisocyanates and carbamic acid chlorides: Methyl-isocyanate, ethylisocyanate, propylisocyanate, isopropylisocyanate, butylisocyanate, isobutylisocyanate, stearylisocyanate, cyclohexylisocyanate, β-cyanoethylisocyanate, ε-isocyanato capropyl chloride, hexahydro-p-phenylene diisocyanate, ethylene diisocyanate, butylene diisocyanate, benzylisocyanate, m-isocyanatobenzyl isocyanate, β-chlorethyl isocyanate, hexamethylene diisocyanate, dodecyl isocyanate, phenyl ethyl isocyanate, carboxyethyl methyl isocyanate, xylene diisocyanate and the like. Instead of the isocyanates themselves the corresponding carbamyl chlorides can be used as starting material. In each instance, halogenation produces the corresponding α-mono or di halogenoalkyl isocyanate or diisocyanate. For example, methyl isocyanate can be chlorinated to form chloromethylisocyanate or dichloromethylisocyanate.

Any suitable halogenating agent can be used in accordance with this invention such as, for example, chlorine, bromine, sulphuryl chloride, sulphuryl bromide and the like. These halogenating agents should of course not affect the NCO-group of the isocyanates.

The reaction is exothermic and when an elementary halogen is used in the halogenation the reaction can frequently be conducted at room temperature in the absence of a catlyst. In other cases, it is preferred to carry out the reaction at an elevated temperature and/or with exposure to light, ultra violet irradiation, or with the use of catalytically active halogen transfer agents such as ferric chloride or the like. Preferably, however, the reaction is carried out while irradiating the reaction mixture with ultra violet radiation.

From 1 to 3 α-hydrogen atoms in the alkyl isocyanate can be replaced by halogen atoms in practicing this invention, depending upon the nature of the alkyl isocyanate to be treated. The number of halogen atoms substituted on the isocyanate is also dependent upon the number of hydrogen atoms available for substitution and the amount of halogen added. By adding sufficient halogen and continuing the treatment long enough all of the hydrogen atoms on the alpha-carbon can be replaced with a halogen.

It is to be understood, however, that the reaction generally results in a product which is in equilibrium with the isomeric alkylidene carbamic acid halide of the isocyanate. The following equations exemplify the reaction of the invention:

$$R-\underset{\underset{H}{|}}{\overset{\overset{H}{|}}{C}}-N=C=O + 1/2Cl_2 \longrightarrow$$

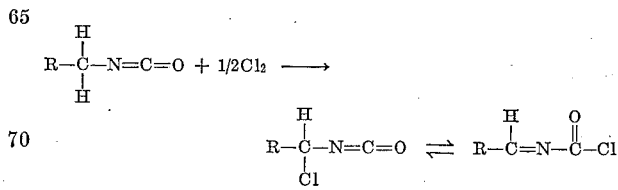

When the isocyanate/carbamic acid chloride is further halogenated, the following reactions occur:

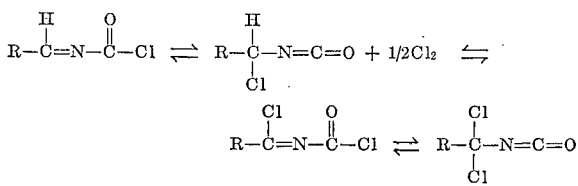

In these equations R represents alkyl, preferably $C_1$ to $C_{18}$ alkyl, alkenyl, preferably $C_1$ to $C_{18}$ alkenyl and aralkyl.

Thus, the products obtained are in a equilibrium state which may be defined as a chlorotropic equilibrium. In case of the monochlorinated products both forms in the equilibrium are present in about equal amounts whereas in the dichlorinated product the equilibrium is on the side of the carbamic acid chloride form. Because of the equilibrium state both types of compounds may react as an alkylidene carbamic acid chloride or as an isocyanate depending on the reaction conditions they are subjected to.

In some of the more energetic reactions where halogenation conditions are at their best it is possible to substitute halogen atoms for hydrogen atoms on carbon atoms other than the one in the alpha-position without halogenolytic splitting of the molecule. For example, it is possible to produce compounds having halogen atoms in both the alpha-position and the beta-position by the present process.

It is not necessary to employ a solvent in the process of this invention. However, it is preferable to use an inert organic solvent if the alpha-halogenoalkyl isocyanate to be formed has a tendency to condense or polymerize. Some suitable solvents which may be used are, for example, carbon tetrachloride, trichlorobenzene and the like.

The halogenation can be performed at any suitable temperature. With increasing temperature the tendency is that more than 1 halogen atom will enter the molecule. With decreasing temperature the reaction rate is slowed down. Below —50° C. the reaction rate appears to become too slow for technical grade production. The upper limit of the reaction temperature is only given by the stability of the isocyanate itself. Temperatures above 300° C. will only be employed if the isocyanate remains stable at that temperature. It is to be understood that isocyanates in the gaseous state may also be used.

The alkyl isocyanates having halogen atoms in the α-position produced in accordance with this invention are very reactive substances which will participate in various types of reactions due to the reactive halogen atoms and isocyanate groups which they contain. One of these reactions is the reaction with amidines. This reaction may be exemplified by the following equation and is described in detail in Belgian Pat. No. 633,232.

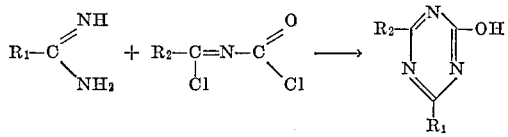

They are suitable for use as intermediates for the production of plant protecting agents, pharmaceuticals, plastics and auxiliary agents for plastics. For example, these isocyanates can be used in preparing polyurethane plastics useful for upholstery, shoe soles or the like.

EXAMPLE 1

About 935 grams of methyl carbamic acid chloride are suspended in about 2 liters of chlorobenzene. Chlorine is then introduced into the suspension at a temperature of from about 40° C. to about 70° C. while irradiating the suspension with ultraviolet light. The temperature of the reaction mixtures must not be allowed to rise above about 70° C. otherwise HCl is split off from the carbamic acid chloride and this makes it difficult to control the weight of chlorine which is absorbed. The reaction mixture is distilled after the calculated quantity of chlorine has been absorbed. The chloromethyl carbamic acid chloride is decomposed with the splitting off of HCl. The resulting mixture of chloromethyl isocyanate and HCl boils between about 82° C. and about 86° C. The chloromethyl isocyanate and HCl combine in the receiver to reform the carbamic acid chloride with strong evolution of heat.

Yield: about 1002 grams.

Analysis of the distillate (calculated on carbamic acid chloride).—Calculated (percent): C, 18.8; H, 2.34; N, 10.9; Cl, 55.4. Found (percent): C, 19.8; H, 2.36; N, 10.2; Cl, 53.6.

The free chloromethyl isocyanate is obtained by heating the carbamic acid chloride to about 120° C. and passing nitrogen therethrough for about three hours. $B.P._{760\ mm.}$ 81° C.–82° C.

Analysis.—Calculated (percent): C, 26.2; H, 2.19; N, 15.3; Cl, 38.8. Found (percent): C, 26.25; H, 2.25; N, 15.04; Cl, 39.6.

EXAMPLE 2

About 105.5 grams of β-chlorethyl isocyanate are chlorinated at about 80° C. to about 150° C., while irradiating with ultraviolet light until there is no further increase in weight. This occurs when about 110 grams of chlorine have been absorbed.

A mixture of 1,1,2,2-tetra-chlorethyl isocyanate and the corresponding alkylidene carbamic acid chloride constantly distills over after blowing with nitrogen to remove any hydrochloric acid at about 120° C.

Yield: about 95% $B.P._{12\ mm.\ Hg}$ 70° C.–72° C.

Analysis.—Calculated (percent): C, 17.2; H, 0.48; N, 6.7; Cl, 68.1. Found (percent): C, 16.6; H, 0.47; N, 6.65; Cl, 69.5.

The isocyanate may be readily separated from the admixture and the alkylidene carbamic acid chloride may then be further halogenated or used in that form for subsequent syntheses or the like.

EXAMPLE 3

About 133 grams of benzyl isocyanate are dissolved in about 250 cc. of carbon tetrachloride. Chlorination is thereafter caried out at a temperature of from about 40° C. to about 0° C. while irradiating with ultraviolet light until about 71 grams of chlorine have been taken up.

A mixture of α-chlorobenzyl isocyanate and the corresponding alkylidene carbamic acid chloride is obtained which constantly distills over after blowing with nitrogen to remove any hydrochloric acid at about 120° C. The yield is about 68% of the theoretical. $B.P._{13\ mm.\ Hg}$ 120° C.–130° C. A resin-like residue is left.

Analysis.—Calculated (percent): C, 57.4; H, 3.6; N, 8.3; Cl, 21.2. Found (percent): C, 56.6; H, 3.66; N, 8.8; Cl, 22.5.

The isocyanate may be readily separated from the admixture and the alkylidene carbamic acid chloride may then be further halogenated or used in that form for subsequent syntheses or the like.

EXAMPLE 4

Chlorine is introduced into a solution of about 193 grams of methyl carbamic acid chloride in about 825 ml. of trichlorobenzene at about 80° C. while irradiating the solution with ultraviolet light. The introduction of chlorine is continued until there is an increase in weight to about 216 grams. The reaction product which boils up to about 160° C. is thereafter distilled.

The following fractions are obtained by fractionation at atmospheric pressure:

(I) 92° C.–103° C. 57 grams
(II) 111° C.–119° C. 40 grams
(III) 119° C.–123° C. 53 grams
Analysis C₂Cl₃ON=molecular weight 160.4

|  | Percent | | | |
| --- | --- | --- | --- | --- |
|  | C | H | N | Cl |
| Calculated | 14.98 | | 8.74 | 66.32 |
| Found: | | | | |
| Fraction I | 15.77 | <0.5 | 7.95 | 65.50 |
| Fraction II | 15.59 | <0.5 | 8.87 | 66.05 |

It is to be understood that any other alkyl isocyanate or alkylene polyisocyanate can be halogenated in accordance with the process of any of the foregoing examples. Although ultraviolet light is used in each of the examples, it is to be understood that under some reaction conditions ultraviolet light is not absolutely necessary. Compounds having bromine substituted in the α-position can be prepared by a similar process by substituting bromine for chlorine.

It is to be understod that other halogen containing isocyanates such as monochloro methylisocyanate, dichloro methylisocyanate, trichloro methylisocyanate, α-chloro ethylisocyanate, α-dichloro ethylisocyanate, α-dichloro-β-dichloro ethylisocyanate, pentachloro ethylisocyanate, α-bromo benzylisocyanate, α-dichloro benzylisocyanate, α-chloro-cyclohexylisocyanate, α-α'-dichloro hexamethylenediisocyanate, 1,4 diisocyanato-1,4-dichloro cyclohexane, α-dichloro-β-monochloro ethyl phenyl isocyanate, α-bromo-β-chloro ethylisocyanate can be prepared in the very same way as given in the foregoing examples.

Although the invention has been described in considerable detail in the foregoing, it is to be understood that such retail is solely for the purpose of illustration and that many variations can be made by those skilled in the art without departing from the spirit and scope of the invention except as set forth in the claims.

What is claimed is:

1. An organic isocyanate, wherein chlorine atoms are substituted for all of the hydrogen atoms on the alpha carbon atom, said organic isocyanate being selected from the group consisting of 1,1,2,2-tetrachloroethyl isocyanate, trichloromethyl isocyanate, pentachloroethyl isocyanate and α-dichlorobenzyl isocyanate.

2. A method for making an alkyl isocyanate having at least one halogen atom in the α-position which comprises flowing a halogen selected from the group consisting of chlorine and bromine gas into an alkyl isocyanate having at least one hydrogen atom in the α-position while simultaneously subjecting the mixture to ultraviolet light until the stoichiometric required amount of halogen has been absorbed, and there after distilling the halogenoalkyl isocyanate from the resulting mixture.

3. A method for making an alkyl isocyanate having at least one halogen atom in the α-position which comprises flowing a halogen selected from the group consisting of chlorine and bromine gas into a suspension of an alkyl carbamic acid halide while irradiating the suspension with ultraviolet light until the hydrogen has been replaced by a halogen in the α-position, said reaction mixture being maintained at a temperature of not more than about 70° C. during the absorption of the halogen and thereafter distilling the halogenoalkyl isocyanate from the resulting mixture.

4. A method for making an aralkyl isocyanate having at least one halgoen atom in the α-position which comprises flowing a halogen selected from the group consisting of chlorine or bromine gas into an aralkyl isocyanate having at least one hydrogen atom in the α-position to the NCO group while simultaneously subjecting the mixture to ultraviolet light until the stoichiometrically required amount of halogen has been absorbed and thereafter distilling the halogenoaralkyl isocyanate from the resulting mixture.

5. A method for making an aralkyl isocyanate having at least one halogen atom in the α-position which comprises flowing a halogen selected from the group consisting of chlorine or bromine gas into a suspension of an aralkyl carbamic acid halide while irradiating the suspension with ultraviolet light until the hydrogen has been replaced by the halogen in the α-position and thereafter distilling the halogenoaralkyl isocyanate from the resulting mixture.

References Cited

UNITED STATES PATENTS

| 2,548,184 | 4/1951 | Westfahl et al. | 260—544 XR |
| 2,915,545 | 12/1959 | Tayuma | 260—453 |

FOREIGN PATENTS 752,931  7/1956  Great Britain.

OTHER REFERENCES

Wenker: Chemical Abstracts, vol. 29, pp. 3665–6 (1935).

Stevens et al.: Chemical Abstracts, vol. 50, pp. 14534–5 (1956).

Rosen: Chemical Abstracts, vol. 55, p. 7339 (1961).

Wagner-Zook: Syn. Org. Chem., John Wiley & Sons, Inc., New York, 1953, pp. 349 and 642 relied upon.

CHARLES B. PARKER, Primary Examiner

D. H. TORRENCE, Assistant Examiner

U.S. Cl. X.R.

204—158; 260—77.5, 248, 465.4, 478, 544, 566, 583, 584, 694, 999